United States Patent [19]

Oyobe et al.

[11] Patent Number: 4,519,820

[45] Date of Patent: May 28, 1985

[54] FITTER APPARATUS FOR PURIFYING EXHAUST GASES

[75] Inventors: Kazuo Oyobe, Ohbu; Etsuji Nomura, Ichinomiya; Kazuma Matsui, Toyohashi; Masanori Fukutani, Nagoya; Kazuyuki Ito, Nishio; Naoto Miwa, Tsushima; Keiji Ito, Kariya, all of Japan

[73] Assignee: Nippondenso Co., Ltd., Kariya, Japan

[21] Appl. No.: 520,126

[22] Filed: Aug. 3, 1983

[30] Foreign Application Priority Data

Aug. 5, 1982 [JP] Japan .................. 57-137040

[51] Int. Cl.$^3$ ............ B01D 39/20; F01N 3/02; F01N 3/16
[52] U.S. Cl. ................... 55/284; 55/466; 55/523; 55/DIG. 10; 55/DIG. 30; 60/303; 60/311; 422/178; 422/180
[58] Field of Search ........ 55/282, 466, 523, DIG. 10, 55/DIG. 30, 284; 210/510.1; 422/174, 178, 180; 60/295, 299, 300, 311, 303; 428/116–118, 188

[56] References Cited

U.S. PATENT DOCUMENTS

| 4,276,071 | 6/1981 | Outland | 55/523 |
| 4,373,330 | 2/1983 | Stark | 55/466 |
| 4,416,676 | 11/1983 | Montierth | 55/523 |
| 4,420,316 | 12/1983 | Frost et al. | 55/523 |
| 4,427,418 | 1/1984 | Kogiso et al. | 55/523 |

FOREIGN PATENT DOCUMENTS 139879 10/1979 Japan .................. 422/180

Primary Examiner—David L. Lacey
Attorney, Agent, or Firm—Cushman, Darby & Cushman

[57] ABSTRACT

Filter apparatus having a honeycomb structure and a heater for purifying exhaust gases consists of cells or passages defined by porous partition walls. Alternate passages are provided respectively with upstream plugs and downstream plugs. Particulates in exhaust gases are trapped in the honeycomb structure and ignited by the heater. The upstream plugs define spaces upstream thereof in which particulates are trapped in addition to those trapped in the passages having downstream plugs. The heat of burning of the particulates trapped in the spaces facilitates the burning of the particulates trapped in the passages having downstream plugs. Therefore, the exhaust gas particulates trapped and collected in the downstream portion of the structure can also be easily burned to regenerate the structure over its entire length.

15 Claims, 24 Drawing Figures

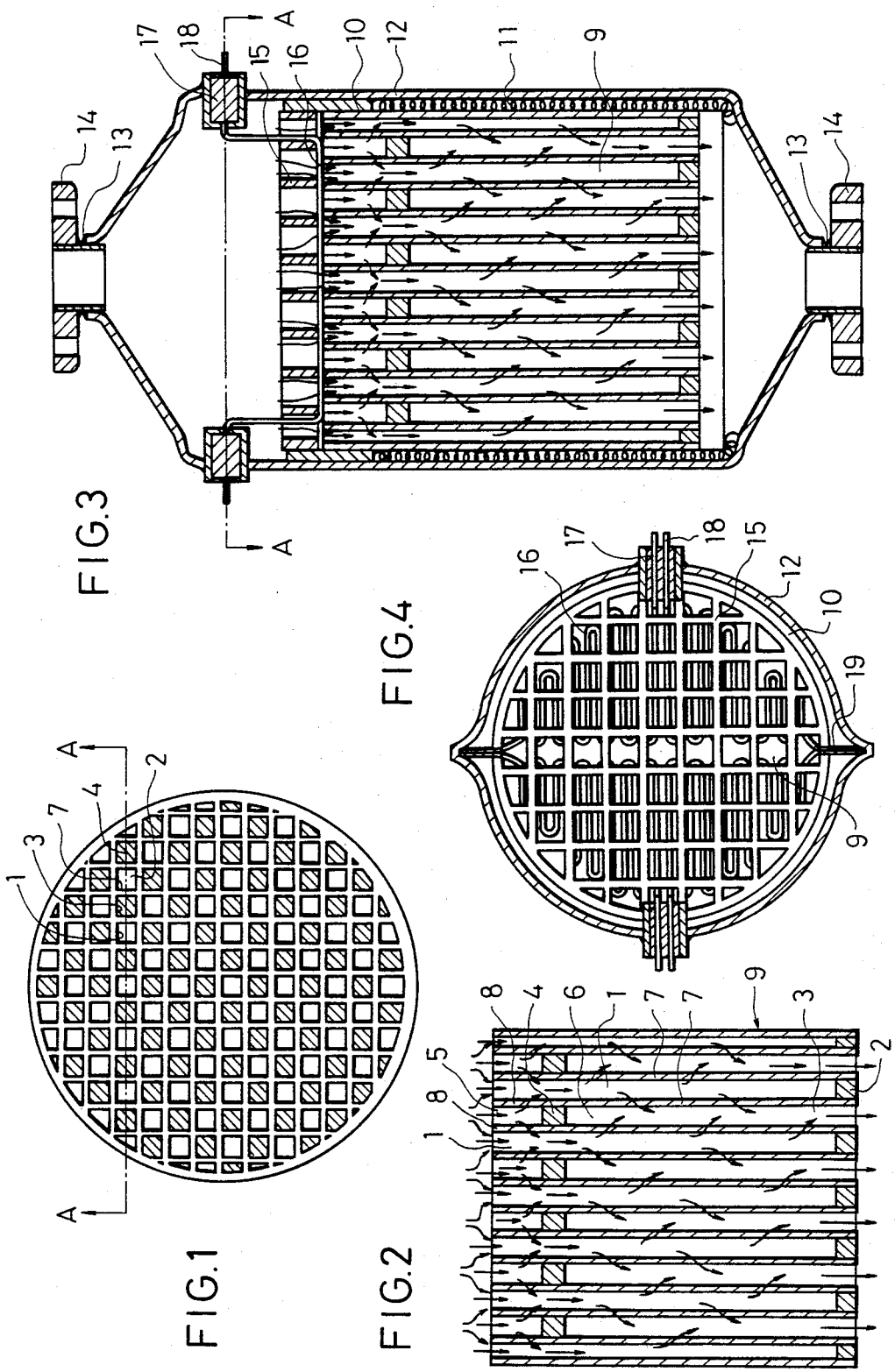

PRESENT INVENTION

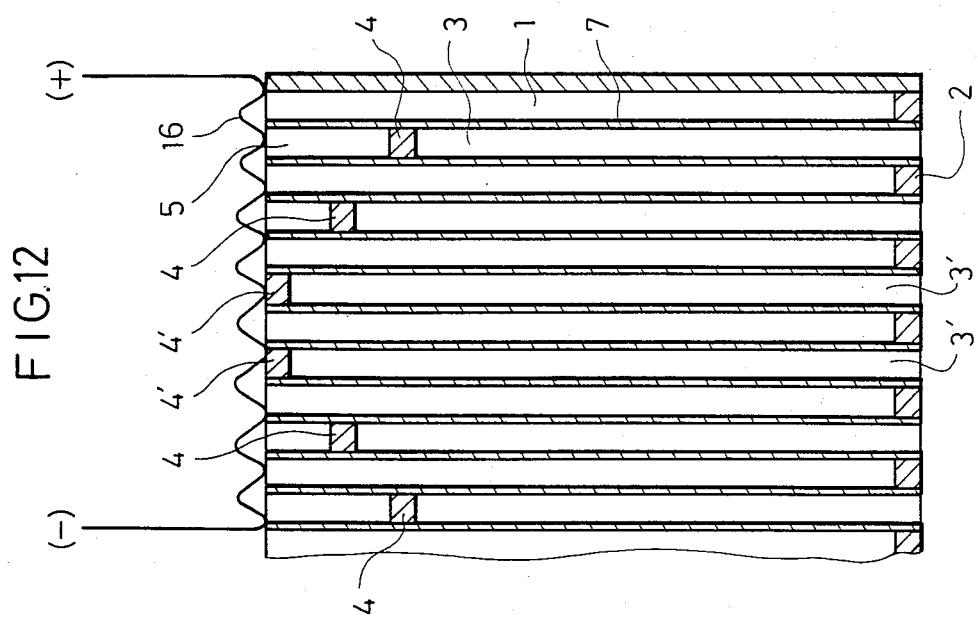
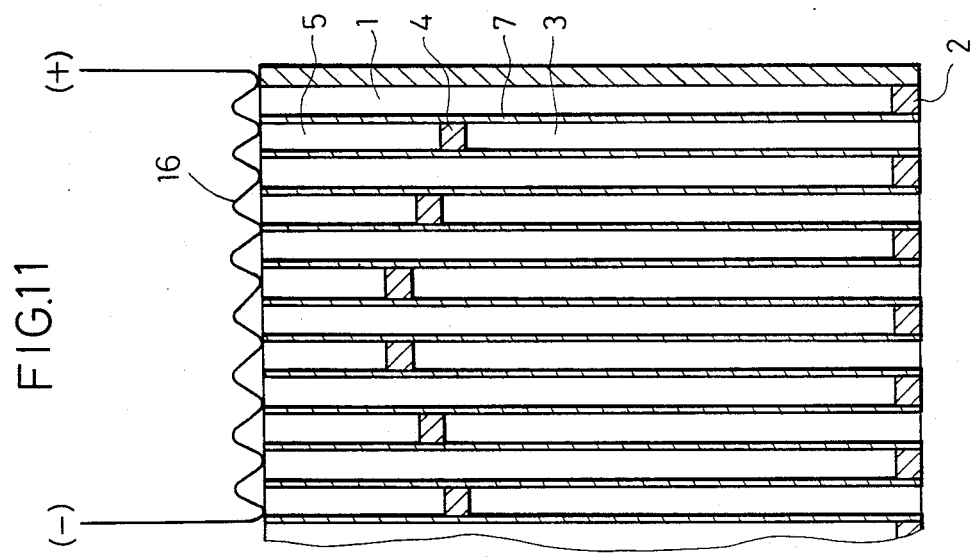

FIG.17(a)
FIG.17(b)
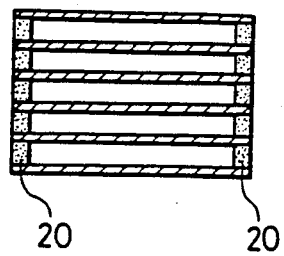
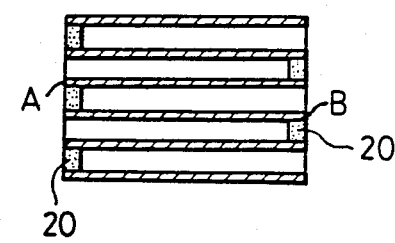
FIG.17(c)
FIG.17(d)
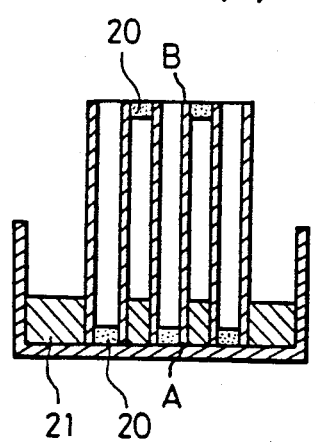
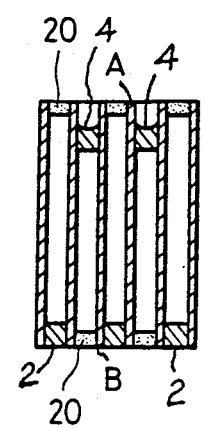
FIG.17(e)
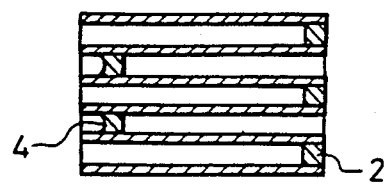

FILTER APPARATUS FOR PURIFYING EXHAUST GASES

BACKGROUND OF THE INVENTION

Field of the Invention

This invention relates to filter apparatus for purifying exhaust gases, which traps and collects particulates mainly composed of carbon in exhaust gases emitted from engines, such as a diesel engine and the like, and burns out said particulates.

Conventionally, the following filter apparatus has been proposed for this purpose.

The filter apparatus has a honeycomb structure having permeable partition walls, and has at least one electric heater installed on the inlet side or upstream end of said structure. The partition walls define a multiple of passages or cells along the longitudinal direction of the structure, and the ends of the passages are closed and open alternately at both ends of the structure to form inlet passages and outlet passages. The exhaust gases flow into the open inlet ends of the respective inlet passages and pass through the partition walls to flow into the outlet passages and out of the open outlet ends thereof. During such passage of the gases, carbon particulates are trapped and collected on the surface of the partition walls forming the inlet passages. Then, the trapped and collected particulates are burned by the heat of said electric heater.

In such apparatus the electric heater and the particulates trapped on the upstream portions of the partition walls are in contact with each other. Therefore, the heat of the electric heater is able to ignite the particulates. Similar apparatus is described in U.S. Pat. No. 4,276,071. This apparatus, consisting of ceramic filter materials, has a honeycomb structure. A multiple of passages is provided along the longitudinal direction of the structure, and the ends of the passages are closed and open alternately at both ends of the structure. Exhaust gas introduced into an inlet passage is filtered through small openings in the porous ceramic layer which constitutes a wall adjacent to another, i.e. an outlet, passage. After a multiple of such filtering, the exhaust gas flows out from the outlet ends of the outlet passages.

The inventors here have examined the conventional apparatus mentioned above, and noted that in the conventional apparatus it is difficult to thoroughly burn the particulates, which adher to the partition walls, by heat of the electric heater. Because, in the conventional apparatus, the electric heater is installed on the upstream end of the apparatus. On the other hand, carbon particulates in exhaust gas are mainly trapped during their passage through the partition walls which separate the multiple inlet and outlet passages. The location where the largest amount of carbon particulates is trapped is not at upstream portions of the partition walls but at place within the partition walls at a distance downstream from the upstream end of the structure. That is, only a small quantity of particulates adhere to the upstream end of the partition walls, and therefore, the amount of heat generated by the burning of these particulates is not enough to maintain a natural burning of all the particulates adhering to the entire partition walls. The heat generated in the heater is readily lost by radiation loss. Therefore, it is difficult to burn particulates adhering to the downstream portion of the partition walls. As a result, it is difficult for conventional apparatus to regenerate the downstream portion of the structure.

SUMMARY OF THE INVENTION

Accordingly, one object of the present invention is to provide filter apparatus for purifying exhaust gases which is provided with a plurality of spaces formed between the upstream end surface of a honeycomb filter structure and the closed upstream portions of the outlet passages to further trap and collect exhaust gas particulates on the surfaces of such spaces.

Another object of the present invention is to provide filter apparatus for purifying exhaust gases which facilitates the burning of the particulates trapped and collected on the partition walls in the downstream portion of the filter.

A further object of the present invention is to provide filter apparatus for purifying exhaust gases which can be regenerated over the entire range between the inlet and outlet ends thereof.

A still further object of the present invention is to provide filter apparatus for purifying exhaust gases having superior effects on its practical use.

These objects of the present invention can be carried out by providing apparatus for purifying exhaust gases having a honeycomb structure, which comprises a plurality of permeable partition walls for trapping and collecting exhaust gas particulates and which define a plurality of passages for the exhaust gases; a plurality of packing plugs provided in the upstream portions of the predetermined passages so as to close the predetermined passages adjacent their upstream ends; a plurality of spaces formed between the upstream ends of the predetermined passages and the aforesaid plugs, for further trapping and collecting exhaust gas particulates therein; a plurality of packing plugs provided in the downstream ends of the remaining passages, which have no upstream plugs herein, so as to close said downstream ends; and at least one heater provided at the inlet end of the honeycomb structure to heat and ignite the trapped particulates.

More particularly, by providing the aforesaid spaces between the upstream ends of predetermined passages and the plugs in the upstream portions thereof, it is possible to increase the quantity of particulates trapped in the upstream portion of the honeycomb structure. As a result, it is possible to easily burn such downstream trapped particulates.

BRIEF DESCRIPTION OF THE DRAWINGS

The above and other features and advantages of the present invention will become more apparent from the following description when considered in connection with the accompanying drawings wherein:

FIG. 1 is a view of the upstream end of a honeycomb filter structure embodying the present invention;

FIG. 2 is a sectional view taken along the line A—A of FIG. 1 and which is used for explaining the operation of the present invention;

FIG. 3 is a sectional view illustrating one example of a particulate trapping device which employs a honeycomb filter structure as shown in FIGS. 1 and 2;

FIG. 4 is a sectional view taken along the line A—A of FIG. 3;

FIGS. 11 to 16 are longitudinal sectional views respectively illustrating further embodiments of honeycomb filter structures according to the present invention; and FIGS. 17(a) to 17(e) are successive sectional views showing one example of a method for producing a honeycomb filter structure according to the present invention.

DETAILED DESCRIPTION OF THE INVENTION

Figure 7:
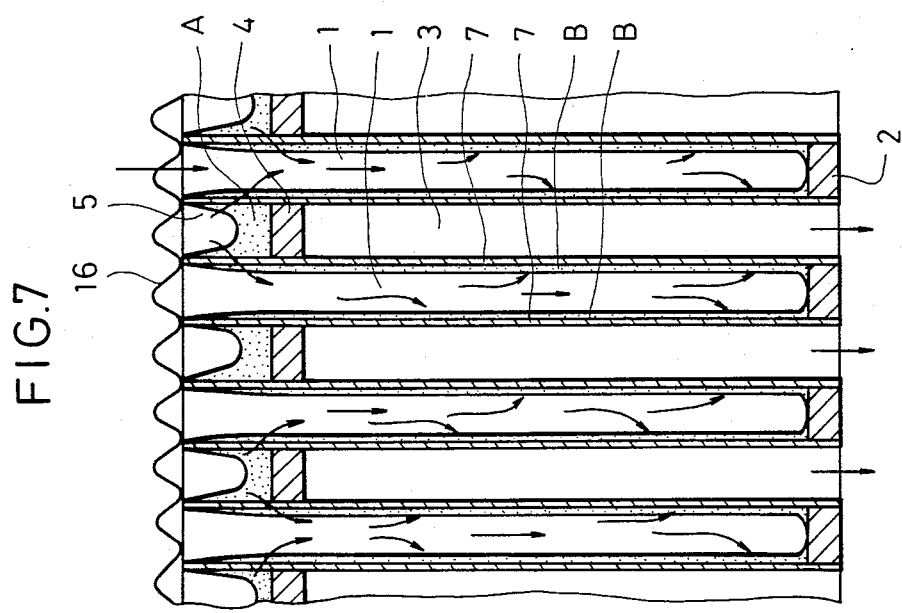
FIG. 7 is an enlarged fragmentary sectional view corresponding to FIG. 2 for explaining the operation of the present invention.

FIGS. 1 and 2 show a ceramic honeycomb structure 9 of cylindrical shape as one embodiment of the present invention. In FIGS. 1 and 2, there are shown a plurality of square-shaped inlet passages or cells 1 and outlet passages or cells 3 and wherein the passages 1 are provided with ceramic packing plugs 2 at the downstream end of the honeycomb structure 9 as shown in FIG. 2. Whereas, passages 3 adjacent to the aforesaid cells 1 and represented by oblique lines are provided with ceramic packing plugs 4 adjacent to but spaced downstream from the upstream end of the honeycomb structure 9.

Thus, in this embodiment, each of the plugs 4 which close the upstream portions of the outlet passages 3 is not located at the upstream end of the corresponding passage 3 as in the prior art, but it is spaced downstream of the upstream end surface of the honeycomb structure 9. As a result, a space 5, which is capable of trapping and collecting particulates in the exhaust gases brought therein, is formed between each of the plugs 4 and the upstream end surface of the structure 9. Consequently, another space 6 is also formed downstream of each of the plugs 4. The space 6 is communicated with the downstream end of the honeycomb structure 9.

The exhaust gases flow into a plurality of inlet passages 1, as shown by arrows in FIG. 2, pass through ceramic permeable partition walls 7 and enter into the spaces 6 communicated with the downstream end of the honeycomb structure 9, whereby the particulates in the exhaust gases are trapped and collected on the surface of the partition walls 7 defining the inlet passages 1.

On the other hand, a part of the exhaust gases enters into the aforesaid spaces 5 to pass through a portion 8 of the partition walls 7 upstream of the plugs 4, which in part defines the space 5. That part of the gases passes again through the partition walls 7 downstream of the plugs 4 to flow into the spaces 6 communicated with the downstream end of the honeycomb structure 9. Therefore, the particulates in the exhaust gases can also be trapped and collected on the portion 8 of the partition walls 7 which surrounds and in part defines the space 5 located upstream of the plug 4.

FIG. 3 illustrates one example of a trapping and collecting device for particulates in the exhaust gases, which employs the honeycomb structure 9.

The structure 9 is supported by a shell 12 made of stainless steel through a seal member 10 and a shock absorbing member 11. The shell 12 is provided with an outlet pipe 13 having a flange 14 welded thereto for connection to an exhaust pipe (not shown) of an engine.

Onto the upstream end surface of the aforesaid structure 9, there are disposed four electric heaters 16 covered by a ceramic honeycomb structure 15.

As shown in FIG. 4, each of the four heaters 16 covers a different quarter of the upstream end surface of the structure 9. One end of each of the heaters 16 is led out of the shell 12 as a terminal 18 through a sleeve 17 consisting of an electric insulator so as to be supplied with electric power. The other end 19 of each of the heaters 16 is connected electrically to the aforesaid shell 12 so as to be grounded, as shown in FIG. 4.

In this case, a plurality of heaters, namely four heaters 16, are provided because the necessary electric power is reduced one-fourth as compared with one big heater. To regenerate the structure 9 (that is, to burn particulates trapped and collected within the structure), the heaters 16 are intermittently supplied with electric power in sequence. Namely, when the trapped quantity of the particulates is in excess of a predetermined quantity, the heaters 16 are supplied with electric power. By means of the heat generated by these heaters 16, the particulates trapped in the upstream portion of the structure 9 are ignited and burn themselves.

The honeycomb structure employed in the present invention, traps and collects the particulates on the surfaces forming the spaces 5 and on the inner surface of the inlet passages 1, as shown in FIG. 7. Therefore, when the heaters 16 are supplied with electric power and heated, the particulates A trapped and collected on the surfaces of the spaces 5 are initially burned. Heat generated by this burning of the particulates A is conducted into the passages 1 adjacent to the passages 3 before being conducted into the passage 3 downstream of the plugs 4. Then the heat passes through the partition walls 7 and, at this time, particulates B trapped on the surface of the partition walls 7 in the inlet passages 1 are heated, ignited, and burn out easily. Thus, the regeneration efficiency of the filter structure increases.

Figure 5:
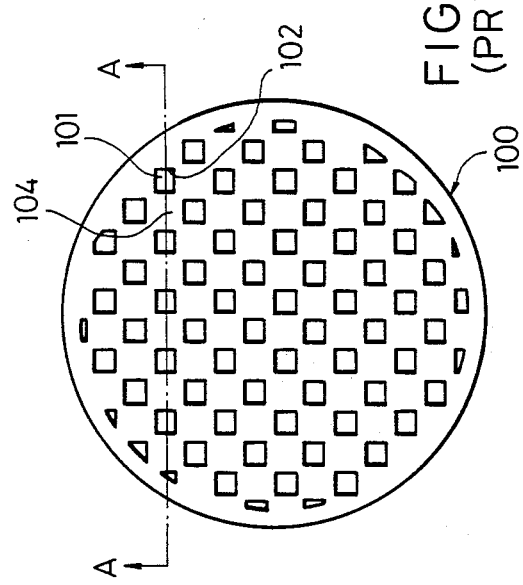
FIG. 5 is an end view illustrating an example of a conventional honeycomb filter structure.
Figure 6:
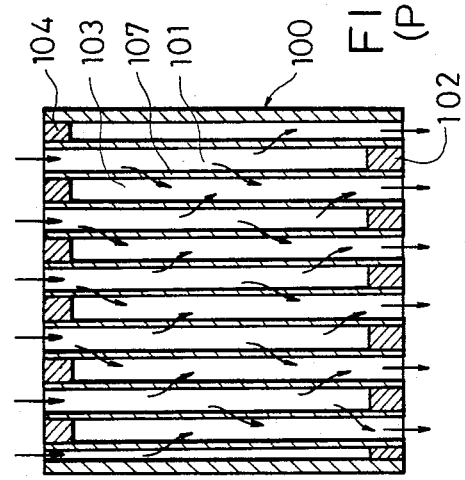
FIG. 6 is a sectional view taken along the line A—A of FIG. 5.

On the other hand, if a conventional honeycomb structure 100, as shown in FIGS. 5 and 6, is used instead of the aforesaid honeycomb structure 9, the particulates therein adjacent the upstream portion of the structure 100 are first ignited, by the usual heater (not shown) and burned. Then the burning heat of the upstream trapped particulates is transmitted to the downstream portion of the structure 100 in some degree to heat particulates trapped in the downstream portion of the structure 100. In this case, however, a large part of the heat is immediately carried away by the exhaust gases flowing into the passages 103 through the partition walls 107. As a result, the particulates trapped in the downstream portion can not be heated sufficiently, resulting in poor regeneration efficiency of the structure 100.

Figure 8A:
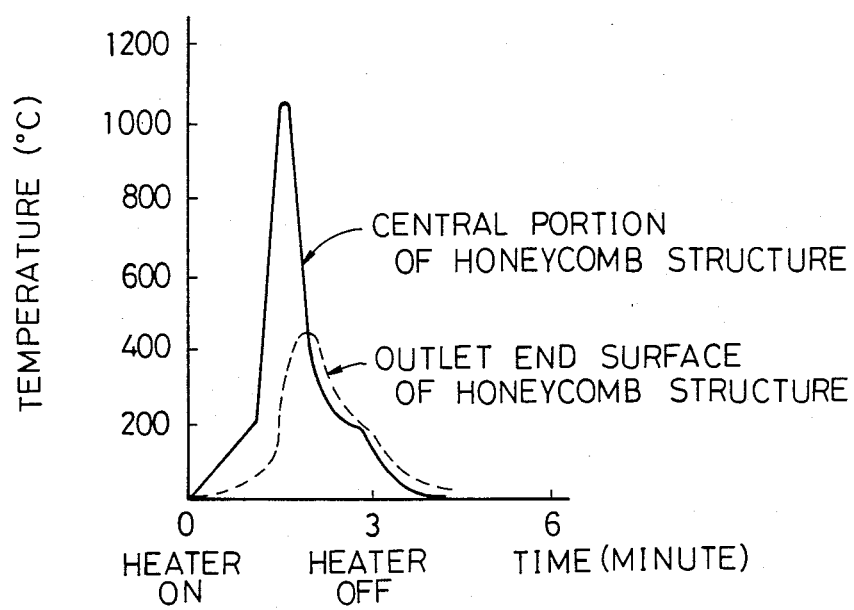
FIGS. 8(a) and 8(b) are characteristic diagrams respectively showing the efficiency of the present invention and that of the prior art, for comparision.
Figure 8B:
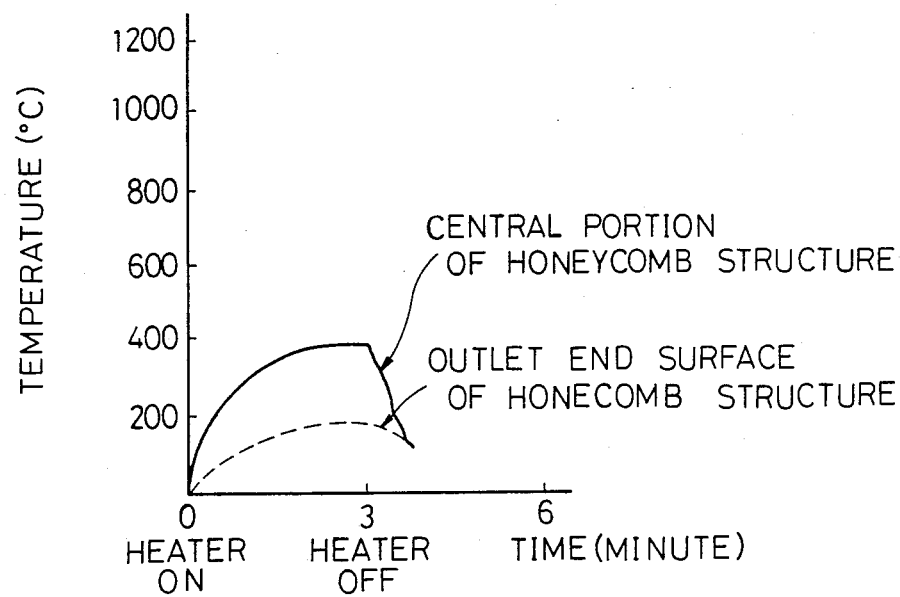

FIGS. 8(a) and 8(b) show measured results (temperatures v. heater on time) of comparative tests of the structure 9 of the present invention and the conventional structure 100, respectively. For this purpose, the respective honeycomb structures had porous partition walls of 100 meshes, diameters of 100 mm and lengths of 100 mm. The plugs 4 in the upstream portion of the structure 9 embodying the present invention were spaced 15 mm downstream from the upstream end surface. In each of the structures, the temperatures at the central portion and the downstream end surface of the structure were respectively measured after electric power was supplied to the heater. The regeneration conditions (quantities of the collected particulates, flow velocities of exhaust gases, and the electric power of the heaters) were the same for both structures 9 and 100.

It is apparent from the results that the particulates collected within the structure 9 embodying the present invention were more sufficiently burned than those within the conventional structure 100.

After the regeneration of the honeycomb structures 9, 100, both were examined. In the case of the structure 9 of the present invention, all the particulates, except those trapped on the outlet or downstream end surface were burned out. However, in the conventional structure 100, only the particulates trapped on the surfaces in the upstream portion between the inlet or upstream end and 20 mm downstream therefrom were burned away.

In the case of the honeycomb structure 9 shown in FIGS. 1 and 2, the number of passages 1 provided with a plug 2 in the downstream end thereof and the number of passages 3 provided with a plug 4 in the upstream portion thereof is 1:1 in ratio. However, this ratio can be appropriately varied and selected in accordance with predetermined regeneration conditions.

Figure 9:
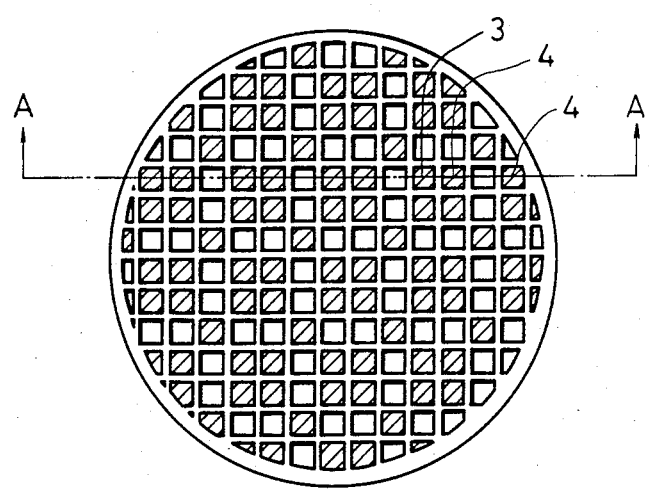
FIG. 9(a) is an end view illustrating another embodiment of a honeycomb filter structure according to the present invention.
FIG. 9(b) is an enlarged fragmentary sectional view taken long the line A—A of FIG. 9(a)
Figure 9:
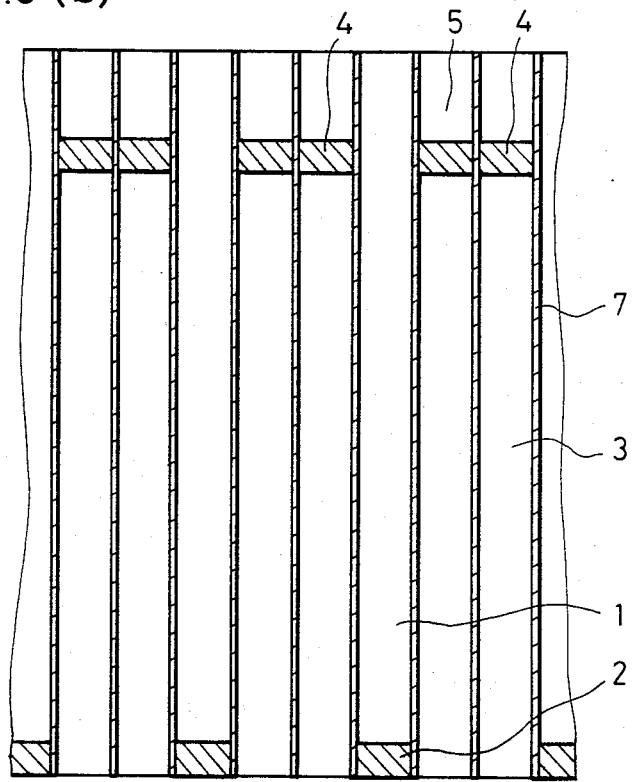

Thus, FIGS. 9(a) and 9(b) illustrate another embodiment of a honeycomb structure according to the present invention, in which the aforesaid ratio is 4:5. In other words, the number of cells 3 provided with plugs 4 is greater than the number of cells 1 having plugs 2 thereby to increase the quantity of particulates trapped on the surfaces defining the spaces 5 upstream of the plugs 4. As a result, the heat generated by burning these particulates is also increased and, therefore, the regeneration at the downstream portion of the structure can be more facilitated.

Figure 10A:
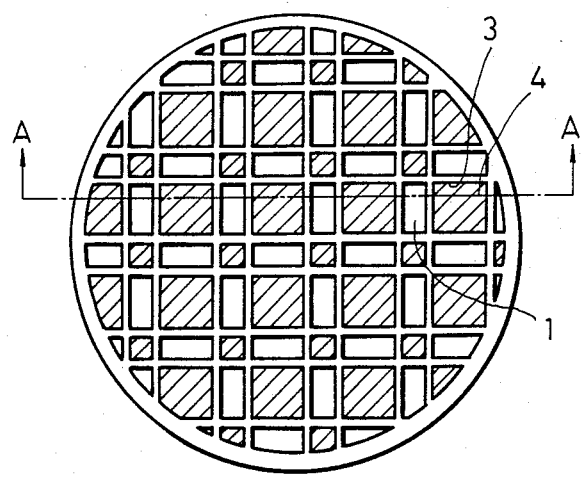
FIG. 10(a) is an end view illustrating still another embodiment of a honeycomb filter structure according to the present invention.
Figure 10B:
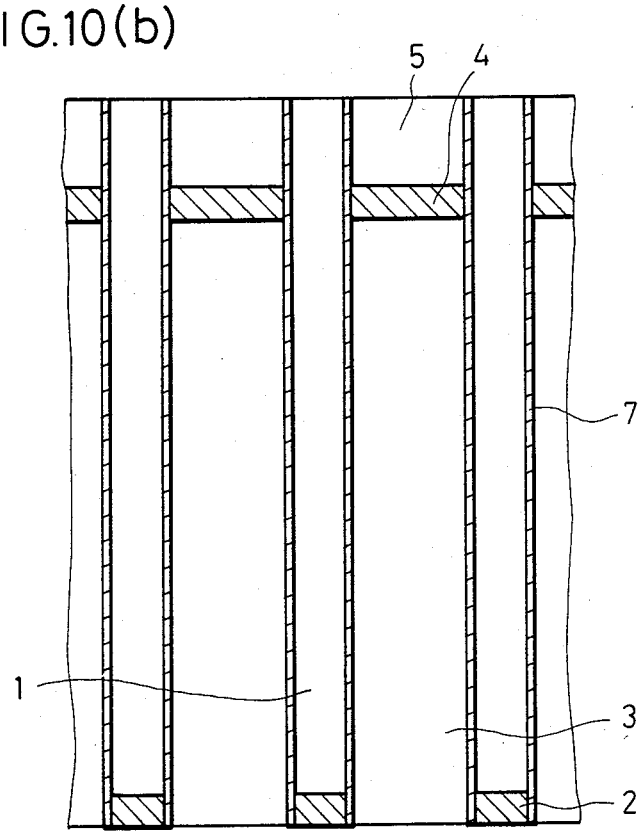
FIG. 10(b) is an enlarged fragmentary sectional view taken along the line A—A of FIG. 10(a)

FIGS. 10(a) and 10(b) illustrate still another embodiment of a honeycomb structure according to the present invention, which has the same object as the aforesaid honeycomb structure of FIGS. 9(a) and 9(b). In this honeycomb structure, the respective cross-sectional areas of the passages 1 and 3 are different from one another with that of the passages 3 being larger than that of passages 1.

FIG. 11 illustrates a further embodiment of a honeycomb structure according to the present invention. In this embodiment, the respective passages 3 are provided with packing plugs 4 at different distances from the upstream ends thereof. Namely, the cells 3 closer to the periphery of the structure have the packing plugs 4 located at greater distances from the upstream end of the structure than the plugs 4 in the passages nearer the center. The space 5 of the passages 3 close to the periphery is longer than the lengths of the space 5 of the passages 3 nearer the center. In regeneration of a honeycomb, a fire in a passage 3 close to the periphery is apt to be extinguished because such a wall is difficult to be heated. As described in this embodiment, the spacing between the plugs 4 and the upstream end of the structure may be changed appropriately, or the spacing may be changed at every cell.

FIG. 12 illustrates a still further embodiment of a honeycomb structure according to the present invention, which is similar to that shown in FIG. 11. In this embodiment, however, some of the packing plugs 4 are located at the upstream ends of the passages 3, respectively, i.e., in the passages 3 situated in the center of honeycomb structure. Thus, one structure may include plugs 4' which are located at the upstream ends of the cells 3' and plugs 4 which are located downstream of the plugs 4' in the passages 3.

Generally speaking, as shown in FIGS. 9 to 12, if the number, or the cross-sectional area, of passages 3 having plugs 4 is increased, or otherwise if the spacing between the plugs 4 and the upstream end of the structure is increased, regeneration of the structure is facilitated. However, if the number of such cells, their cross-sectional area or such spacing is excessively increased, the passing area for exhaust gases is decreased so that there is a rise of exhaust gas back pressure, which is encountered at the time when the structure is arranged in an engine. Therefore, in order to determine the aforesaid matters, such as the ratio of the total cross-sectional areas of the passages having plugs 4 therein with that of the passages having plugs 3 therein, the spacing between the plugs 4 and the upstream end, and the like, it is required to take engine output, regeneration conditions, etc., into consideration.

Figure 13:
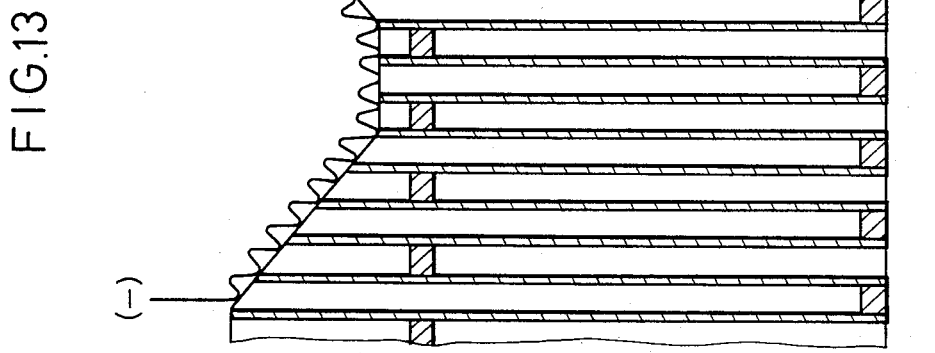

FIG. 13 illustrates a still further embodiment of a honeycomb structure according to the present invention, which is directed to the same object as the honeycomb structure of FIG. 11. In this honeycomb structure, each of the plugs 4 is initially located at a constant predetermined spacing in the passages 3 from their upstream ends and then the upstream end surface of the structure is worked to be cut off, whereby the distances from the upstream end surface of the honeycomb structure to each plugs 4 are different.

Figure 14:
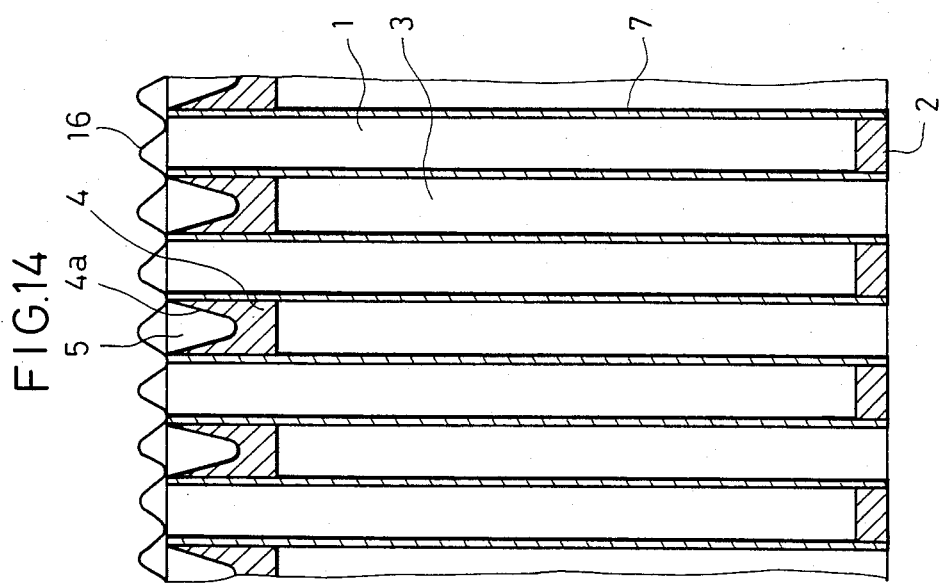
Figure 16:
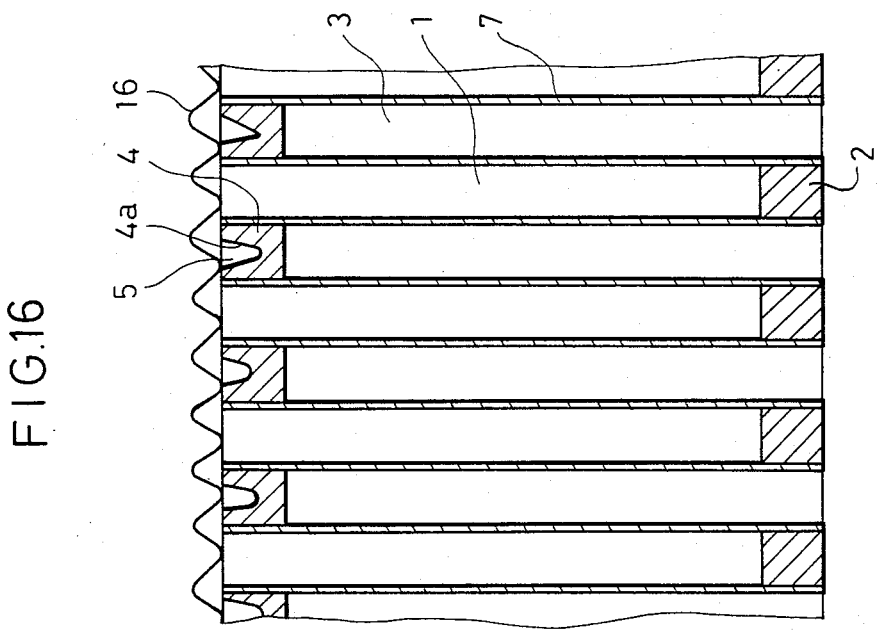
Figure 15:
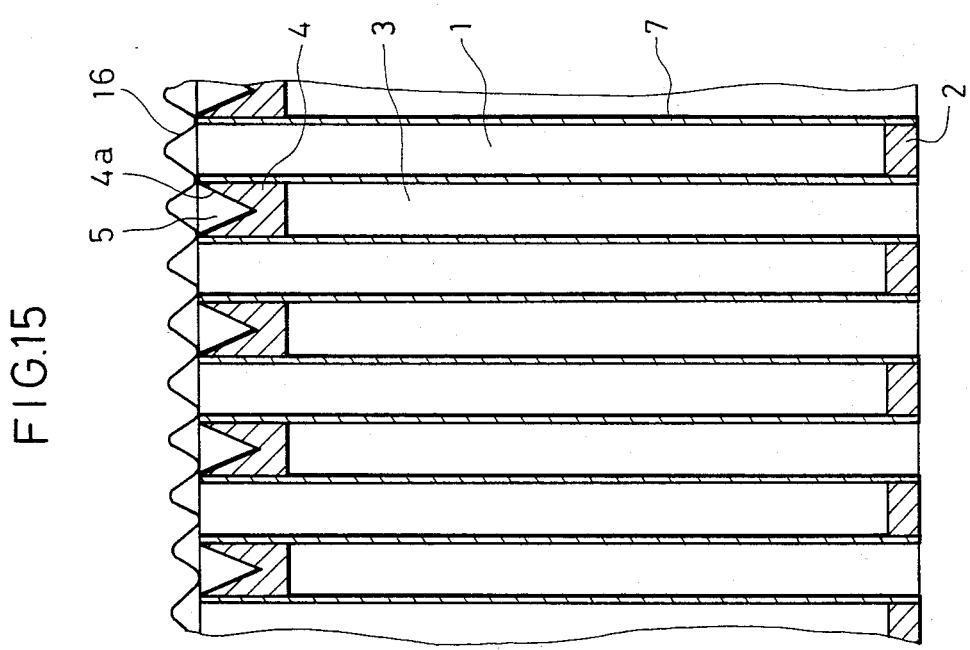

Moreover, plugs 4 may be also modified. FIGS. 14 to 16 illustrate modifications of the plugs 4. In these modifications, each of the plugs 4 is located in its passage 3 flush with the inlet or upstream end surface of the honeycomb structure, but each of the plugs 4 is provided on its upstream end with a concave surface 4a to form a space 5. In this case, since particulates in exhaust gases are trapped on the surface 4a defined in the aforesaid space 5, the same effects can be obtained as in the previously described embodiments wherein the plugs 4 are located at predetermined distances downstream from the upstream ends of the passages 3.

In the same manner as in the aforesaid embodiments, the shape and size of the concave surface 4a on the plug 4 may be varied. Moreover, it is also possible to combine plugs 4 having concave surfaces 4a whose shape and size are different, as shown in FIGS. 14 to 16, in one honeycomb structure, or to combine plugs 4 having concave surfaces 4a with other plugs 4 having no concave surfaces 4a in one honeycomb structure. Further, plugs 4 having concave surfaces 4a may also be located in the passages 3 at different distances downstream from the inlet end surface of the structure as shown in the previously described embodiments.

Next, an example of a method for producing a honeycomb structure according to the present invention will be described. Thus, as shown in FIG. 17(a), all of the opposite ends of the passages in a honeycomb structure are plugged, for example, with wax 20. Then, as shown in FIG. 17(b), some of the wax plugs 20 are removed, i.e., the wax plugs 20 at one end A of each passage are removed from every other passage, whereas, at the other end B, the wax plugs 20 are removed from those passages where the opposite ends A are still plugged. Then, as shown in FIG. 17(c), one end A of the resulting honeycomb structure is dipped in a slurry 21 containing ceramic. At this time, the distance from the end A, at which the plugs in the aforesaid embodiments are to be located in the passages, is determined in accordance with the depth of the slurry.

Thus, by dipping the one end A of the structure in the slurry, the slurry enters into each of the passages having no wax plug 20. The honeycomb structure itself is made of porous ceramic. Therefore, since the honeycomb structure has water absorption power, water contained in the upper portion of the slurry entered into the passages is absorbed by the honeycomb partitions defining the respective passages. As a result, the slurry is solidified at that portion. On the other hand, however, the lower portion of the slurry entered into the passages is not solidified, since the slurry at the lower portion contacts with less area of the honeycomb partitions to absorb water sufficiently. Therefore, the lower portion of the slurry is maintained in a slurry condition.

Thereafter, as shown in FIG. 17(d), the resulting honeycomb structure is turned upside down to naturally deposit such a slurry with no solidification on the solidified portion of slurry. As a result, plugs 4 are formed by the solidified slurry and the deposited slurry. At the end surface B, plugs 2 are formed in the same manner. At this time, the depth of the slurry is adjusted to be less than before. The resulting structure is dried and then calcined to remove the wax plugs 20. Consequently, both the ceramic plugs 2 and 4 and the honeycomb walls are sintered. Thus, a honeycomb structure as shown in FIG. 17(e) is obtained.

As an example of other modifications and changes in the method, ceramic plugs are embedded into an unsintered honeycomb structure and the whole subsequently sintered.

As described above, according to the present invention, particulates trapped in the downstream range of the honeycomb structure can be sufficiently burned. Therefore, all ranges of the honeycomb structure can be regenerated entirely. Therefore, the present invention has a great effect on its practical use.

What is claimed is new and intended to be covered by Letters Patent is:

1. Filter apparatus for purifying exhaust gases comprising:
    a honeycomb structure having permeable partition walls forming generally parallel inlet and outlet passages for the gases, particulates in the gases being trapped on some of the surfaces of said inlet passages;
    upstream packing plugs located in upstream portions of said outlet passages so as to close said passages, at least some of said upstream plugs being spaced downstream from the upstream end surface of said structure so as to define spaces between said upstream end surface of said structure and said upstream plugs for trapping and collecting exhaust gas particulates on at least some of the surfaces of said spaces;
    downstream packing plugs located in the downstream ends of said inlet passages so as to close said inlet passages; and
    at least one heater located at the upstream end of said honeycomb structure to heat and ignite the particulates trapped and collected in the upstream portions of said structure including the particulates trapped on said spaced surfaces.

2. Apparatus according to claim 1 wherein the inlet passages alternate with the outlet passages.

3. Apparatus according to claim 1 wherein said at least some upstream end plugs are spaced such that at least some of the spaces are of approximately equal length.

4. Apparatus according to claim 1, wherein said at least some upstream end plugs are spaced such that at least some of the spaces are of different lengths.

5. Apparatus according to claim 4 wherein the upstream plugs are generally in alignment laterally of the passages and the upstream end surface of the structure is non-planar.

6. Apparatus according to claim 1 wherein the number of outlet passages is greater than the number of inlet passages.

7. Apparatus according to claim 1 wherein the cross-sectional area of the inlet passages is different from that of the outlet passages.

8. Apparatus according to claim 1 wherein the cross-sectional area of said inlet passages is the same as that of said outlet passages.

9. A structure according to claim 1 wherein the at least one heater comprises a plurality of electric heaters for operation in sequence.

10. Filter apparatus for purifying exhaust gases comprising:
    a honeycomb structure having permeable partition walls forming generally parallel inlet and outlet passages for the gases, particulates in the gases being trapped on some of the surfaces of said inlet passages;
    upstream packing plugs located in upstream portions of said outlet passages so as to close said passages, at least some of said upstream plugs having a concave surface on the upstream end thereof so as to define spaces between the upstream end surface of said structure and said upstream plugs for trapping and collecting exhaust gas particulates on at least some of the surfaces of said spaces;
    downstream packing plugs located in the downstream ends of said inlet passages so as to close said inlet passages; and
    at least one heater located at the upstream end of said honeycomb structure to heat and ignite the particulates trapped and collected in the upstream portions of said structure including the particulates trapped on said spaced surfaces.

11. Apparatus according to claim 10 wherein the inlet passages alternate with the outlet passages.

12. Apparatus according to claim 10 wherein the number of outlet passages is greater than the number of inlet passages.

13. Apparatus according to claim 10 wherein the cross-sectional area of the inlet passages is different from that of the outlet passages.

14. Apparatus according to claim 10 wherein the cross-sectional area of said inlet passages is the same as that of said outlet passages.

15. A structure according to claim 10 wherein the at least one heater comprises a plurality of electric heaters for operation in sequence.

* * * * *